United States Patent
Van Hoogenbemt (10) Patent No.: US 11,573,767 B2
(45) Date of Patent: Feb. 7, 2023

(54) CALCULATION PROCESSOR AND CALCULATION METHOD FOR DETERMINING AN EXPONENTIAL FUNCTION

(71) Applicant: ams AG, Premstaetten (AT)

(72) Inventor: Stefaan Margriet Albert Van Hoogenbemt, Premstaetten (AT)

(73) Assignee: AMS AG, Premstaetten (AT)

( * ) Notice: Subject to any disclaimer, the term of this patent is extended or adjusted under 35 U.S.C. 154(b) by 113 days.

(21) Appl. No.: 16/957,979

(22) PCT Filed: Jan. 15, 2019

(86) PCT No.: PCT/EP2019/050975
§ 371 (c)(1),
(2) Date: Jun. 25, 2020

(87) PCT Pub. No.: WO2019/149521
PCT Pub. Date: Aug. 8, 2019

(65) Prior Publication Data
US 2021/0373853 A1    Dec. 2, 2021

(30) Foreign Application Priority Data

Jan. 31, 2018 (EP) .................................. 18154511

(51) Int. Cl.
*G06F 7/552* (2006.01)
*G06F 7/556* (2006.01)
*G06F 1/03* (2006.01)

(52) U.S. Cl.
CPC ............. *G06F 7/552* (2013.01); *G06F 7/556* (2013.01); *G06F 1/0307* (2013.01); *G06F 2101/08* (2013.01); *G06F 2101/10* (2013.01)

(58) Field of Classification Search
CPC ........ G06F 1/0307; G06F 7/552; G06F 7/556; G06F 2101/08; G06F 2101/10
See application file for complete search history.

(56) References Cited

U.S. PATENT DOCUMENTS 5,473,373 A    12/1995  Hwung et al.
7,167,888 B2 *  1/2007  Du ........................ G06F 1/0356
                                                     708/606

(Continued)

OTHER PUBLICATIONS

Pineiro, J. A. et al., "Algorithm and Architecture for Logarithm, Exponential, and Powering Computation", IEEE Transactions on Computers, vol. 53, No. 9, Sep. 2004, pp. 1085-1096.

(Continued)

*Primary Examiner* — Matthew D Sandifer
(74) *Attorney, Agent, or Firm* — MH2 Technology Law Group LLP (57) ABSTRACT

A calculation processor for determining a digital output value from a digital input value based on an exponent value a, the processor comprising a first calculation block, a second calculation block and a final calculation block. The first calculation block initializes an intermediate value and an error value depending on a position of a Most Significant Bit of a significant part of the input value. The second calculation block is configured to perform repeatedly, until an exit criterion is fulfilled, the incrementation of a counter value, the determination of a power error value based on the error value and, if the power error value is larger than or equal to an error threshold, adjustment of the intermediate value y by multiplying the intermediate value with an adaptation value and setting the error value to the power error value divided by the base value. If the power error value is smaller than the error threshold, the error value is set to the power error value. The final calculation block is configured to set the output value to the intermediate value.

18 Claims, 4 Drawing Sheets

(56) References Cited

U.S. PATENT DOCUMENTS 9,141,131 B2 * 9/2015 Felch ................. G06F 7/552
2002/0147753 A1 10/2002 Rao et al.

OTHER PUBLICATIONS

Takagi, N., "Powering by a Table Look-Up and a Multiplication with Operand Modification", IEEE Transactions on Computers, vol. 47, No. 11, Nov. 1998, pp. 1216-1222.
European Patent Office, International Search Report for PCT/EP2019/050975 dated Apr. 9, 2019.

* cited by examiner

CALCULATION PROCESSOR AND CALCULATION METHOD FOR DETERMINING AN EXPONENTIAL FUNCTION

The present disclosure relates to a calculation processor and to a calculation method, each for determining a digital output value from a digital input value based on an exponent value.

BACKGROUND OF THE INVENTION

In several applications, in particular sensor applications, continuous processing of the sensor signal is necessary. For example, some applications or standards require that a sensor value as read out from a sensor circuit is processed with a given formula that may include an exponential term in the form of $x^a$ with x being an input value and a being an exponent value.

Such calculations usually are performed with conventional microprocessors having implemented specific standard calculation algorithms or having implemented a look-up table with precalculated values for each possible input value.

While the latter approach requires a large amount of memory and/or area on a semiconductor die, the speed of microprocessor calculation algorithms may be insufficient and/or arbitrary.

SUMMARY OF THE INVENTION

The present disclosure provides an improved calculation concept for determining the value of an exponential function. The improved calculation concept is based on the idea that an error factor can be introduced into a representation of an exponential function in the form of $$y = x^a \tag{1}$$

where x represents an input value, a represents a particularly fixed exponent value and y represents an output value to be calculated. It has been found by the inventor that by implementing several iterations from an initial setting of the error factor or error value, the output value can be determined with a high accuracy. In particular, the accuracy to be achieved can be defined by a number of iterations. The output value is determined from an intermediate value that is refined during the iterations after an initial setting.

For example, the improved concept comprises a first calculation block for initializing the values for the iterations that are performed in a second calculation block. A final calculation block may be implemented for determining an output value from an intermediate value provided by the second calculation block.

For example, a calculation processor according to the improved calculation concept for determining a digital output value from a digital input value IN based on an exponent value a comprises the first calculation block, the second calculation block and the final calculation block. The first calculation block is configured to determine a position number n denoting a position of a Most Significant Bit, MSB, of a significant part of the input value IN. For example, the lowest significant bit, LSB, represents a position number 0, such that the highest possible position number would be 7 for an 8-bit input value. Generally, the position numbers are numbered from 0 to m−1, with m being the word length of the input value.

The first calculation block is further configured to set an intermediate value $y = b^{a \cdot n}$ with b being a base value, to set an error value $err = IN/b^n$ and initialize a counter value k. For example, the counter value k is initialized to k=0.

The second calculation block is configured to perform each of the following until an exit criterion is fulfilled: Increment the counter value k by 1, determine a power error value perr with $perr = err^b$. If the power error value perr is larger than or equal to an error threshold, adjust the intermediate value y by multiplying the intermediate value with an adaptation value being dependent on the counter value k. If the power error value perr is larger than or equal to the error threshold, set the error value err to the power error value perr divided by the base value b. If the power error value perr is smaller than the error threshold, set the error value err to the power error value perr.

The final calculation block is configured to set the output value to the intermediate value y. Accordingly, which each repetition in the second calculation block, the error value err and the intermediate value y are refined based on the actual values of the error value or the power error value perr and on the counter value k. Hence, with each repetition, the error value err converges to a desired final error value while the intermediate value y converges to the exact value of the calculation.

The exit criterion may be the error value reaching a defined value or range, which could be checked after each iteration step. In such case, the number of iterations may be varying for different input values.

In some implementations, the exit criterion may be a given number of iterations for the second calculation block such that for each output value, said number of iterations is performed. In such an implementation, a calculation time for each input value IN or output value is constant. This may be useful if input values are to be processed sequentially, the input values being provided at a given rate.

For example, the second calculation block is configured to determine the adaptation value as $b^a/b^k$. The second calculation block may comprise an adaptation look-up table and/or a fixed adaptation circuit resulting from a programming in a hardware description language for determining the adaptation value. If implemented with an adaption look-up table, this table only needs a limited number of entries for k from 1 to the maximum number of iterations.

If, for example, implemented as an application-specific integrated circuit, ASIC, the same limited number of adaption values could be represented as fixed hardware values that may result from the programming in the hardware description language, for example in the very high speed integrated circuit hardware description language known as VHDL.

In a similar fashion, in some implementations the first calculation block for setting the intermediate value y comprises an intermediate look-up table and/or a fixed intermediate circuit resulting from a programming in a hardware description language. In an implementation with the look-up table, the number of entries is limited to the word length of the input value. The same number of entries could be represented in hardware resulting from the programming in the hardware description language, e.g. VHDL.

While the improved calculation concept generally works with any base value b, several advantages arise, in particular with respect to implementation of binary number representation, if the base value is chosen as 2. For example, in such implementations where the base value is 2, the first calculation block may comprise a barrel shifter for setting the error value err from the input value IN. In particular, the resulting division err=IN divided by $2^n$, i.e. err=IN/$2^n$ can be implemented by an n-times shift operation.

In a similar fashion, with the base value being 2 the second calculation block may comprise a 1-bit shifter for setting the error value err to the power error value perr divided by 2.

Also determining the power error value can be simplified by using 2 as the base value. For example, the second calculation block comprises a multiplier, in particular a square multiplier or a squaring device, for determining the power error value perr.

In various implementations the error threshold equals the base value.

In some implementations the second calculation block comprises a comparator for comparing the power error value perr to the error threshold.

As mentioned above, the exit criterion may be fulfilled if the counter value k is equal to or greater than a predefined repetition value L. In such an implementation, the second calculation block may comprise L−1 instances of respective circuitry, in particular similar circuitry, for each repetition of the increment steps of the counter value k, the determination of the power error value perr and the respective actions if the power error value perr is larger than or equal to the error threshold. Furthermore, the second calculation block comprises a further instance of respective circuitry for a final repetition of the increment step of the counter value k and the determination of the power error value perr and the adjustment of the intermediate value y if the power error value perr is larger than or equal to the error threshold. The implementation with distinct instances for each repetition step assures that a calculation time for each input value or output value remains constant, in particular independently from usually varying input values. This can be further useful when processing sequences of input values with a fixed data rate.

In various implementations the processor may be implemented as an integrated circuit, in particular as an application specific integrated circuit, ASIC, which is free from a microprocessor. Accordingly, all calculations as mentioned above are implemented with specific hardware representations. For example, no software or programming of a microprocessor are needed to perform the calculations mentioned above.

With implementation as an integrated circuit, it is assumed that the base value is chosen fixedly, in particular as 2. Furthermore, the exponent value a may also be chosen fixedly for a given desired application. However, as mentioned above, values depending on the exponent value a, namely the initial intermediate value in the first calculation block and the adaption value in the second calculation block may still be made programmable, e.g. via look-up tables.

In various implementations the calculation processor can be directly implemented e.g. on an image sensor providing thousands or millions of sensor values within a limited time frame, i.e. a frame rate of the image sensor. Generally speaking, such a calculation processor can be implemented in the digital data path of image sensors that can be used in film cameras or image cameras (e.g. 4K-HD and others).

Hence according to the improved calculation concept, an image sensor arrangement is provided that includes an image sensor for providing sensor values from a plurality of image pixels and a calculation processor according to one of the embodiments described above for processing the sensor values, in particular in a serial fashion.

The calculation processor according to one of the aforementioned implementations can be used in an imaging device having one or more optical sensors, in particular an array of optical sensors like a pixel array. Such imaging devices or image sensor arrangements may be further employed in camera systems of various electronic devices.

Such electronic devices may include smartphones, tablet computers, portable computers and the like, but also larger devices such as personal computers and/or their displays. Electronic devices further include photo or video cameras and smart watches and other wearables.

The improved calculation concept also allows compressing the input data during the calculation, e.g. by loosing or cutting a number of bits. For example, two bits may be intentionally lost with an implementation according to some ITU recommendations.

The improved calculation concept can also be implemented or described as a calculation method for determining a digital output value from a digital input value IN based on an exponent value a. Such method may comprise:
 a) determine a position number n denoting a position of a Most Significant Bit, MSB, of a significant part of the input value IN;
 b) set an intermediate value $y=b^{a \cdot n}$ with b being a base value;
 c) set an error value err=IN/$b^n$;
 d) initialize a counter value k;
the method further comprising performing repeatedly each of the steps e), f), g1), g2), g3) until an exit criterion is fulfilled:
 e) increment the counter value k by 1;
 f) determine a power error value perr with perr=$\text{eff}^b$;
 g1) if the power error value perr is larger than or equal to an error threshold, adjust the intermediate value y by multiplying the intermediate value y with an adaptation value being dependent on the counter value k;
 g2) if the power error value perr is larger than or equal to the error threshold, set the error value err to the power error value perr divided by the base value b;
 g3) if the power error value perr is smaller than the error threshold, set the error value err to the power error value perr;
 h) set the output value to the intermediate value y.

As mentioned above, the adaptation value may be determined as $b^a/b^k$.

Further implementations of the calculation method become readily apparent for the skilled person from the various descriptions made with respect to the embodiments of the calculation processor.

BRIEF DESCRIPTION OF THE DRAWINGS

The improved concept will be described in more detail in the following with the aid of drawings. Elements having the same or similar function bear the same reference numerals throughout the drawings. Hence their description is not necessarily repeated in subsequent drawings.

In the drawings.

DETAILED DESCRIPTION

In various applications calculation of an exponential function is necessary. In the following, a calculation processor will be described that allows the calculation of such exponential values, in particular without the use of a microprocessor. One possible but not limiting application for such calculation processor is the gamma calculation with signals in opto-electronic circuits.

For example, the calculation processor is used as a or in a circuit that can calculate the opto-electronic transfer characteristics of image pixels, according to recommendations ITU-R BT.709-6, ITU-R BT.2020-2 and ITU-R BT.2100-0, and all associated types of calculations. These specifications do require the calculation of:

$$\text{OUT} = 1.099 \cdot \text{IN}^{0.45} - 0.099 \qquad (2)$$

This disclosure is mainly about the pipelined way of calculating the "$\text{IN}^{0.45}$" part of this formula. The calculation is also known as a "gamma calculation". The pipelined architecture enables a calculation on all the pixels in a serial and/or streamed way, where all calculations will have exactly the same latency.

Hence, the value to be calculated in particular is:

$$y = x^a \qquad (3)$$

where a is an exponent value. The value a may be set to a=0.45 for ITU-R applications, as mentioned above. However, the improved calculation concept is not limited to a specific exponent value.

Equation (3) can also be written as:

$$y = x^a = b^{\log_b(x^a)} \qquad (4)$$

with b being a base value. Generally, b may be chosen as an arbitrary value. However, in the following b is chosen as 2, which may be advantageous in view of e.g. binary operations. Hence equation (4) may be rewritten as:

$$y = x^a = 2^{\log_2(x^a)} \qquad (5)$$

An "error" factor err can be introduced in the formulas (4) or (5) from above. The formula is still correct when we write the following:

$$y \cdot 2^{\log_2(err^a)} = x^a_r \qquad (6)$$

where err=1.

In practice this form of the formula leaves the possibility to start with a value for y of which we know that it is wrong (in practice it may be put to "1"), but which is gradually adapted in an iterative way. So step by step, y will evolve into $x^a$, while err will go from $x^a$ to 1, using e.g. ASIC friendly calculation techniques. These steps can be implemented in the hardware. So:

$$\begin{cases} err : x \to 1 \\ y : 1 \to x^a \end{cases} \qquad (7)$$

Figure 1:
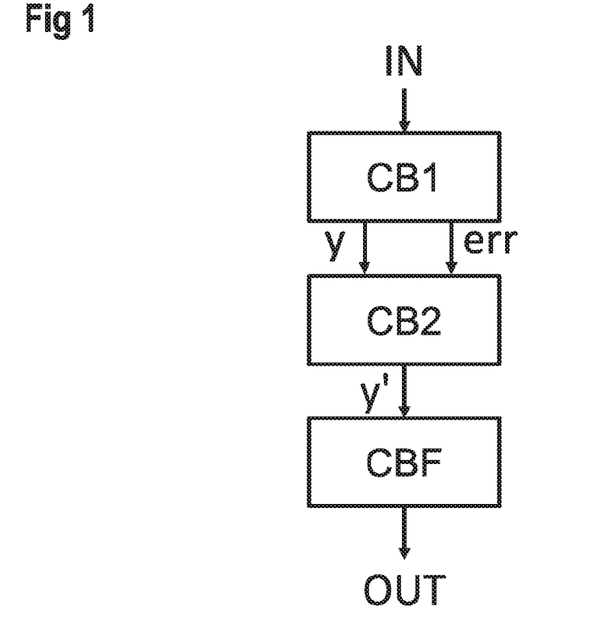
FIG. 1 shows a block diagram of an exemplary implementation of a calculation processor according to the improved calculation concept.

FIG. 1 shows a block diagram of an exemplary implementation of a calculation processor that implements the calculation steps described above. For example, the calculation processor comprises a first calculation block CB1 that initializes an intermediate value y and an error value err from the input value IN. A second calculation block CB2 iteratively refines these values until an exit criterion is fulfilled. A final calculation block CBF determines an output value OUT from the refined intermediate value y'.

The individual calculation blocks CB1, CB2 and CBF will be described in more detail in the following in conjunction with FIG. 2, FIG. 3 and FIG. 4.

Figure 2:
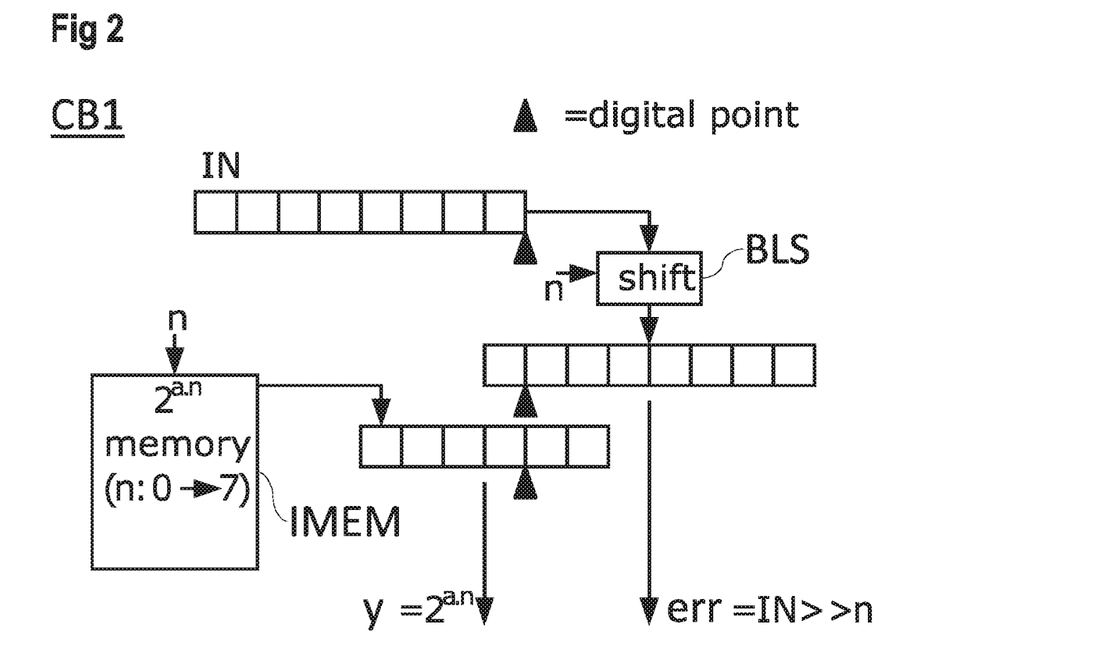
FIG. 2 shows an exemplary implementation of a first calculation block.

FIG. 2 shows an exemplary implementation of the first calculation block CB1 for implementing the first step of the iterative procedure mentioned above.

The first step uses the position of the Most Significant Bit, MSB, ("1") of the significant part of the input value IN. It will result in a value for "1≤err<2". Let us call the position of this MSB "n".

With the starting positions of "err" and "y", $$\begin{cases} err = x \\ y = 1 \end{cases}, \qquad (8)$$

the following calculations are leading to the new values of "err" and "y", called "err'" and "y'".

$$y \cdot 2^{\log_2(err^a)} = x^a \qquad (9)$$

$$y \cdot 2^{a \cdot \log_2(err)} = x^a \qquad (10)$$

$$y \cdot 2^{a \cdot \log_2\left(2^n \cdot \frac{err}{2^n}\right)} = x^a \qquad (11)$$

$$y \cdot 2^{a \cdot \left[n + \log_2\left(\frac{err}{2^n}\right)\right]} = x^a \qquad (12)$$

$$y \cdot 2^{a \cdot n} \cdot 2^{a \cdot \left[\log_2\left(2^n \cdot \frac{err}{2^n}\right)\right]} = x^a \qquad (13)$$

$$\begin{cases} err' = \dfrac{err}{2^n} \\ y' = y \cdot 2^{a \cdot n} = 1 \cdot 2^{a \cdot n} \end{cases} \qquad (14)$$

It should be noted that for an arbitrarily chosen base value b, equation (14) reads:

$$\begin{cases} err' = \dfrac{err}{b^n} \\ y' = y \cdot b^{a \cdot n} = 1 \cdot b^{a \cdot n} \end{cases} \qquad (15)$$

Referring to equation (8) and with x=IN, the error value err and the intermediate value y after the first step or the first calculation block CB1 hence can be generally determined as:

$$\begin{cases} err = \dfrac{IN}{b^n} \\ y = b^{a \cdot n} \end{cases} \qquad (16)$$

Then:

$$y' \cdot 2^{a \cdot \log_2(err')} = x^a \qquad (17)$$

So the new formula to work with becomes:

$$y \cdot 2^{a \cdot \log_2(err)} = x^a \qquad (18)$$

Referring to FIG. 2, the input value IN is provided as a binary word, in this example as an 8-bit word. The division operations for determining the error value err corresponding to equations (14) or (15) or (16) may be implemented by a shifting operator BLS, which can be embodied as a barrel shifter, for example. The shifting is made based on the position number n that can be determined from the actual value of the input value IN. For example the determination of the position number n and the calculation of the initial error value may be seen from the following table 1, which serves as an example for an 8-bit input word. Other word lengths undergo the same scheme. For example, all data formats are unsigned integers. The letter symbols in the input value IN and the error value err denote arbitrary bit values that particularly have no effect on the determination of the position number n.

TABLE 1

| IN | n | err |
| --- | --- | --- |
| 00000001 | 0 | 1.0000000 |
| 0000001x | 1 | 1.x000000 |
| 000001xy | 2 | 1.xy00000 |
| 00001xyz | 3 | 1.xyz0000 |
| 0001xyzk | 4 | 1.xyzk000 |
| 001xyzkm | 5 | 1.xyzkm00 |
| 01xyzkmn | 6 | 1.xyzkmn0 |
| 1xyzkmnp | 7 | 1.xyzkmnp |

The values for the intermediate value y according to equation (14) or (15) or (16) may be performed using some kind of memory IMEM that stores the binary value for the respective calculation term.

As an example, this is shown in table 2 below. The column on the far right shows the initial intermediate values with 4 bits before and 2 bits behind the digital point, as an example. Other number formats still may be used, which should be apparent to the skilled reader.

The position of the digital point in FIG. 2 is for calculation purposes only. It can, for example in a later stage, be moved in order to fit the result to a required number of output bits, suitable for the desired application.

TABLE 2

| n | a | a · n | 2^ (a · n) | binary (4 + 2) |
| --- | --- | --- | --- | --- |
| 0 | 0.45 | 0 | 1 | 0001.00 |
| 1 | 0.45 | 0.45 | 1.366040257 | 0001.01 |
| 2 | 0.45 | 0.9 | 1.866065983 | 0001.11 |
| 3 | 0.45 | 1.35 | 2.549121255 | 0010.10 |
| 4 | 0.45 | 1.8 | 3.482202253 | 0011.01 |
| 5 | 0.45 | 2.25 | 4.75682846 | 0100.11 |
| 6 | 0.45 | 2.7 | 6.498019171 | 0110.01 |
| 7 | 0.45 | 3.15 | 8.876555777 | 1000.11 |

From now on a sequence of identical or quasi-identical steps has to be performed until "err=1" or until "err" is small enough. The exact number can be subject of a case-specific simulation. The steps are numbered by "k", starting from 0.

Figure 3:
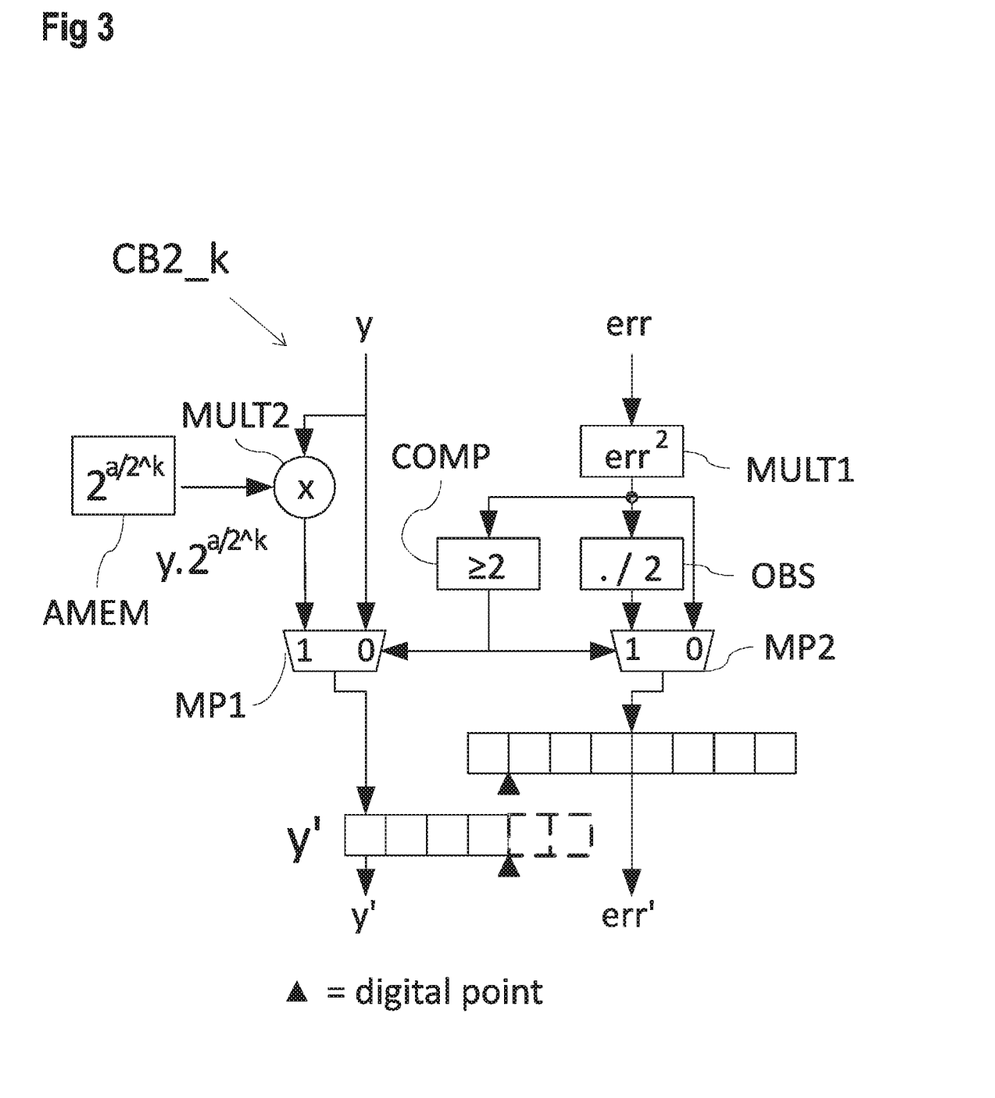
FIG. 3 shows an exemplary implementation of a repetition instance in the second calculation block.

Referring now to FIG. 3, an exemplary implementation of one calculation instance CB2_k is shown that performs the respective calculations of step k.

The distinguishing is made based on a power error value perr that generally is determined as perr=err$^b$, which is perr=err$^2$ for the specific implementation with the base value being 2. Referring to FIG. 3, this is implemented with a multiplier MULT1 for performing the power operation or square operation. The result of this operation is compared to an error threshold with comparator COMP. In a specific implementation the error threshold equals the base value, which is 2 in the specific example.

The input from the previous step k is of the form:

$$y \cdot 2^{\left[\frac{a}{2^k} \cdot \log_2(err)\right]} = x^a, \quad (19)$$

which can also be written as $$y \cdot 2^{\left[\frac{a}{2^k} \cdot \log_2\left(err^{2^1/2}\right)\right]} = x^a. \quad (20)$$

For the actual step, k is incremented by 1. Now, for the approximation, two cases have to be distinguished.
Case 1: Err$^2$<2:
So, when "err$^2$<2", after "k" iterations, then:

$$y \cdot 2^{\left[\frac{a}{2^{k+1}} \cdot \log_2(err^2)\right]} = x^a \quad (21)$$

New values for the following step:

$$\begin{cases} err' = err^2 \\ y' = y \\ k' = k + 1 \end{cases} \quad (22)$$

$$y \cdot 2^{\left[\frac{a}{2^{k'}} \cdot \log_2(err')\right]} = x^a \quad (23)$$

Or:

$$y \cdot 2^{\left[\frac{a}{2^k} \cdot \log_2(err)\right]} = x^a \quad (24)$$

Case 2: Err$^2$≥2:
So, in this case, after "k" iterations:

$$y \cdot 2^{\left[\frac{a}{2^{k+1}} \cdot \log_2(err^2)\right]} = x^a \quad (25)$$

$$y \cdot 2^{\left[\frac{a}{2^{k+1}} \cdot \log_2\left(2 \cdot \frac{err^2}{2}\right)\right]} = x^a \quad (26)$$

$$y \cdot 2^{\left[\frac{a}{2^{k+1}} + \frac{a}{2^{k+1}} \cdot \log_2\left(2 \cdot \frac{err^2}{2}\right)\right]} = x^a \quad (27)$$

$$y \cdot 2^{\frac{a}{2^{k+1}}} \cdot 2^{\left[\frac{a}{2^{k+1}} \cdot \log_2\left(\frac{err^2}{2}\right)\right]} = x^a \quad (28)$$

$$\begin{cases} err' = err^2/2 \\ y' = y \cdot 2^{\frac{a}{2^{k+1}}} \\ k' = k + 1 \end{cases} \quad (29)$$

$$y \cdot 2^{\left[\frac{a}{2^{k'}} \cdot \log_2(err')\right]} = x^a \quad (30)$$

Or:

$$y \cdot 2^{\left[\frac{a}{2^k} \cdot \log_2(err')\right]} = x^a \quad (31)$$

The adaptation of the intermediate value y or y' and the error value err or err' are made with respective multiplexers MP1, MP2 providing the respective selected output based on the comparison result.

The division by two of the power error value or the square error value in equation (29) may for example be performed by a 1-bit shifter when implemented in hardware.

The multiplication of the previous intermediate value y with an adaptation value by the second multiplier MULT2 can be performed with the adaptation value being retrieved from an adaptation memory AMEM. The adaptation memory AMEM may be a look-up table that may be common to different instances CB2_k of the second calculation block CB2, wherein an actual value is retrieved based on the counter value k. In an alternative implementation, the adaptation value, which is fixed for each iteration stage, may be stored in a fixed adaptation circuit resulting from a programming in a hardware description language like VHDL. The intermediate value y' at the output of the calculation instance CB2_k represents the actual approximation of the output value to be calculated according to equation (3).

In a hardware implementation, the same block could be used physically several times, until a desired number of iterations is performed or until the error value is small enough. However, in some implementations, several instances of the instance CB2_k as shown in FIG. 3 could be used with a distinct physical implementation of each instance.

Figure 4:
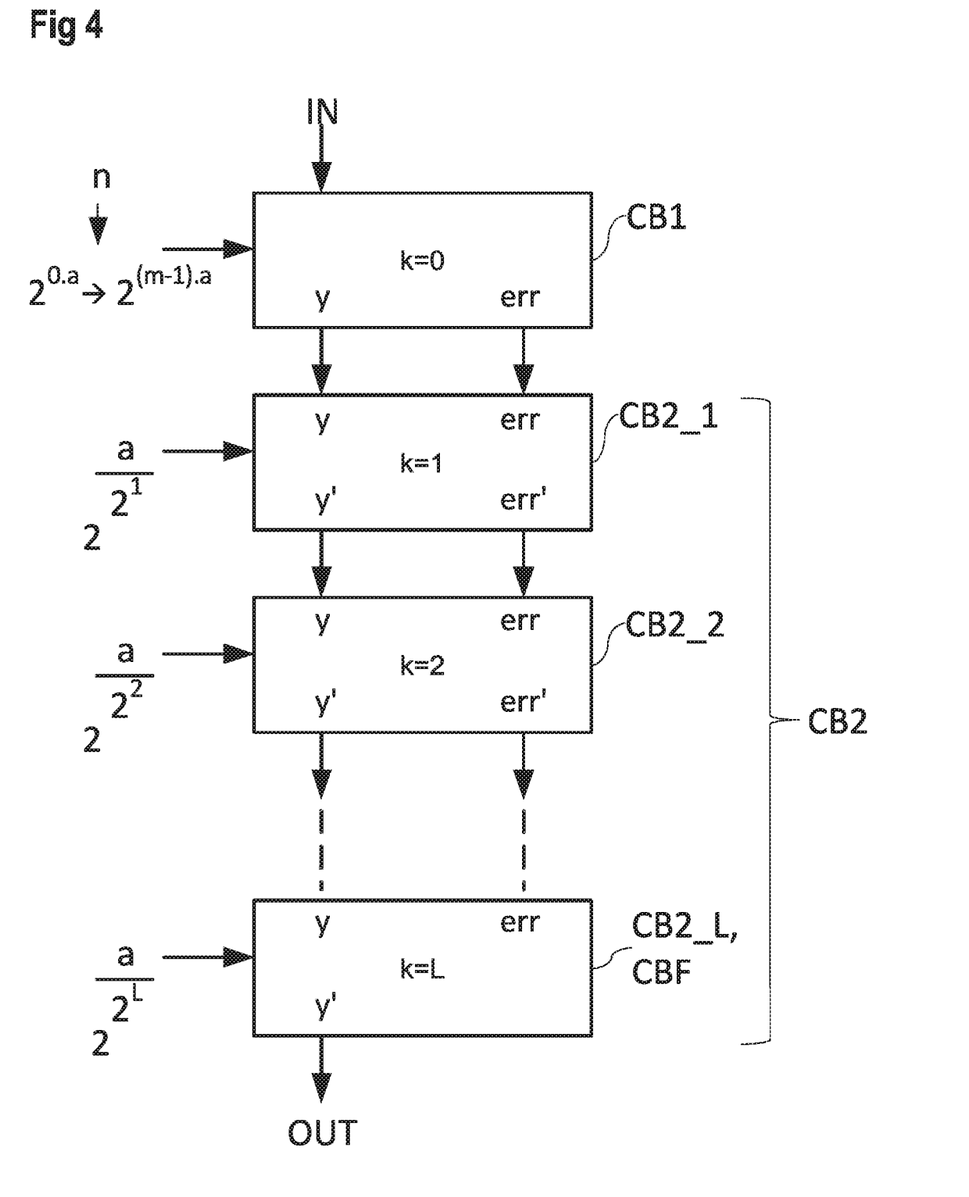
FIG. 4 shows a block diagram of a further implementation of a calculation processor.

For example, FIG. 4 shows an exemplary implementation of a calculation processor according to the improved calculation concept that implements the latter mentioned approach.

Accordingly, the calculation processor comprises the first calculation block CB1 that may be implemented as shown in FIG. 2 for providing initial values for the intermediate value y and the error value err from the input value IN, denoting the stage k=0.

The second calculation block CB2 may be implemented with a predefined number L instances of calculation instances CB2_1, CB2_2 to CB2_L as described in conjunction with FIG. 3. However, for the last stage CB2_L the blocks concerning the update of the error value err', in particular blocks OBS and MP2 can be omitted, as only the intermediate value y' is needed as an output.

Moreover, the last instance can directly be used also as the final calculation block CBF for generating the output value OUT.

Referring to FIG. 4, the calculation block instances with k=1 to L are provided with respective adaptation values, which are fixed values for each stage.

It should be noted that the implementation according to FIG. 4 realizes a pipelined architecture that enables processing of sequential input values in a serial or streamed way, wherein all calculations between input and output have the same latency.

As mentioned above, if the calculation processor is used for a gamma calculation according to equation (2), an additional multiplier and an additional subtractor could also be easily added to the implementation of FIG. 4.

Moreover, such a calculation processor can be directly implemented e.g. on an image sensor providing thousands or millions of sensor values within a limited time frame, i.e. a frame rate of the image sensor. Generally speaking, such a calculation processor can be implemented in the digital data path of image sensors that can be used in film cameras or image cameras (e.g. 4K-HD and others).

Accordingly, the calculation processor according to the improved calculation concept allows processing of a large amount of data, i.e. pixels of an image processor that are provided as a serial readout such that the calculations can be performed very fast in order not to reduce the output speed, and as such not reduce the frame rate of the sensor on which the calculation processor is implemented.

The serial treatment of the pixels takes benefit of such a calculation processor with a predefined latency, in order to make serial calculations possible, at a speed which can be the transmission speed of the samples. Hence, the calculations that may be necessary according to the ITU recommendations can be performed directly on the sensor chip and do not need to be performed outside the sensor chip, e.g. on a dedicated image processor.

The various implementations may be implemented as integrated circuits, in particular as application-specific integrated circuits, ASICs, such that no microprocessor is needed for performing the respective calculations.

The respective binary representations of the adaption values and the initial intermediate values can be determined in advance and provided hardcoded, i.e. as hardware into the circuit.

Figure 5:
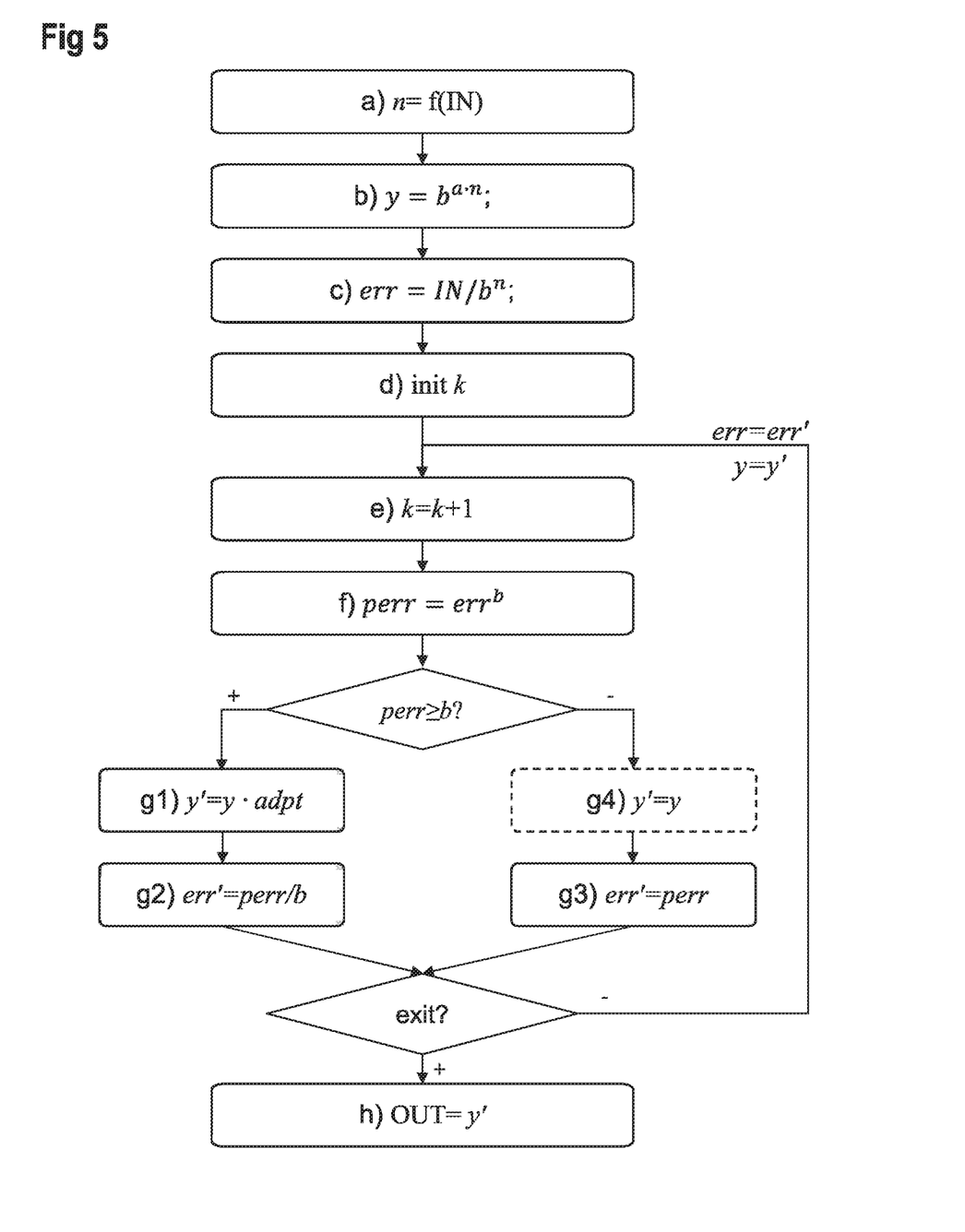
FIG. 5 shows a block diagram of an exemplary implementation of a calculation method according to the improved calculation concept.

Referring now to FIG. 5, a block diagram of an exemplary embodiment of a calculation method according to the improved calculation concept is shown. In step a), the position number n is determined as a function of the input value IN, in particular denoting the position of the MSB of a significant part of the input value IN. This has for example been described in conjunction with table 1 above.

In step b) an initial value for the intermediate value y is determined in accordance with the calculation in equation (16). With the base value b chosen as 2, also equation (14) applies.

In step c) the initial error value is set in accordance with equation (16) or (14), if the base value is 2.

In step d) a counter value k is initialized, for example to 0.

The following steps e), f), g1), g2), g3), g4) are performed iteratively and/or repeatedly.

For example, in step e), the counter value k is incremented by 1. In step f), a power error value is determined. If the base value is 2, the power error value is a square error value. If the power error value or square value is larger than an error threshold, in particular the base value b, the intermediate value y1 is set to the previous intermediate value y multiplied with an adaptation value ADPT being dependent on the counter value k. This is for example described in conjunction with equation (29). Furthermore, in step g2), the new error value err' is set to the power error value divided by the base value b.

If the power error value perr is smaller than the error threshold or the base value, the new error value err' is set to the power error value perr in step g3). In optional step g4), the new intermediate value y' is set to the old intermediate value y. Step g4) is optional as in fact no change to the value y is made.

If an exit criterion is fulfilled, the last intermediate value y' is set as the output value OUT in step h). If not, the previous steps are repeated with the error value err being err' and the intermediate value y being y'.

It should be noted that with the description of the method of FIG. 5, only the elementary steps have been described. However, both the mathematics and the specific implementation of the method should be apparent for the skilled reader from the detailed description above in conjunction with FIGS. 1 to 4.

The invention claimed is:

1. A calculation processor for determining a digital output value from a digital input value based on an exponent value a, the processor comprising:
   a first electronic logical calculation processing element that is configured to:
   a) determine a position number n denoting a position of a Most Significant Bit, MSB, of a significant part of the input value IN;

b) using n to lookup an intermediate value $y=b^{a \cdot n}$ from a memory, with b being a base value;

c) set an error value $err=IN/b^n$ via a first shifter circuit; and d) initialize a counter value k, a second electronic logical calculation processing element that is configured to perform repeatedly each of the following e), f), g1), g2), g3), g4) until an exit criterion is fulfilled:

e) increment the counter value k by 1;

f) determine a power error value pen with $perr=err^b$ via a first multiplier circuit;

g1) adjust the intermediate value y by multiplying the intermediate value y with an adaptation value being dependent on the counter value k via a second multiplier circuit;

g2) divide the power error value perr by the base value b via a second shifter circuit;

g3) if the power error value pen is larger than or equal to an error threshold, select the output of the second multiplier circuit as a value y' with a first multiplexer and select the output of the second shifter circuit as a value err' with a second multiplexer;

g4) if the power error value pen is smaller than the error threshold, select the intermediate value y as a value y' with the first multiplexer and select the power error value pen as the value err' with the second multiplexer; and a final electronic logical calculation processing element that is configured to set the output value to the value y', wherein the second electronic logical calculation processing element is configured to determine the adaptation value as $b^{a/b^{\wedge}k}$ and the second electronic logical calculation processing element comprises an adaptation look-up table and/or a fixed adaptation circuit resulting from a programming in a hardware description language for determining the adaptation value.

2. The processor according to claim 1, wherein the first electronic logical calculation processing element comprises an intermediate look-up table and/or a fixed intermediate circuit resulting from a programming in a hardware description language for setting the intermediate value y.

3. The processor according to claim 1, wherein the first electronic logical calculation processing element is configured to initialize the counter value to k=0.

4. The processor according to claim 1, wherein the base value is 2.

5. The processor according to claim 1, wherein the error threshold equals the base value.

6. The processor according to claim 1, wherein the second electronic logical calculation processing element comprises a comparator for comparing the power error value perr to the error threshold.

7. The processor according to claim 1, wherein the exit criterion is fulfilled if the counter value k is equal to or greater than a predefined repetition value L, and wherein the second electronic logical calculation processing element comprises L-1 instances of respective circuitry for each repetition of steps e), f), g1), g2), g3) and g4) and a further instance of the respective circuitry for a final repetition of steps e), f), and g1).

8. The processor according to claim 1, which is implemented as an integrated circuit, wherein the integrated circuit comprises an application-specific integrated circuit that is free from a microprocessor.

9. An image sensor arrangement, comprising an image sensor for providing sensor values from a plurality of image pixels, and a processor according to claim 1, for processing the sensor values as respective digital input values (IN) in a serial fashion.

10. An electronic device with a camera system comprising an image sensor arrangement according to claim 9.

11. A calculation method for determining a digital output value from a digital input value based on an exponent value a, the method comprising performing steps a), b), c), and d) with a first electronic logical calculation processing element:

a) determining a position number n denoting a position of a Most Significant Bit, MSB, of a significant part of the input value IN;

b) using n to lookup an intermediate value $y=b^{a \cdot n}$ from a memory, with b being a base value, wherein the base value is 2;

c) setting an error value $err=IN/b$ via a first shifter circuit;

d) initializing a counter value k;

the method further comprising performing repeatedly each of the steps e), f), g1), g2), g3), g4) with a second electronic logical calculation processing element until an exit criterion is fulfilled:

e) incrementing the counter value k by 1;

f) determining a power error value perr with $perr=err^b$ via a first multiplier circuit;

g1) adjusting the intermediate value y by multiplying the intermediate value y with an adaptation value being dependent on the counter value k via a second multiplier circuit;

g2) dividing the power error value perr by the base value b;

g3) if the power error value perr is larger than or equal to an error threshold, selecting the output of the second multiplier circuit as a value y' with a first multiplexer and selecting the output of the second shifter circuit as a value err' with a second multiplexer;

g4) if the power error value perr is smaller than the error threshold, selecting the intermediate value y as a value y' with the first multiplexer and selecting the power error value perr as the value err' with the second multiplexer; the method further comprising:

h) setting the output value to the value y' for sensor signal processing by a digital image sensor circuit component.

12. The method according to claim 11, wherein the adaptation value is determined as $$b\frac{a}{b^{\wedge}k}.$$

13. A calculation processor for determining a digital output value from a digital input value based on an exponent value a, the processor comprising:

a first electronic logical calculation processing element that is configured to:

a) determine a position number n denoting a position of a Most Significant Bit, MSB, of a significant part of the input value IN;

b) using n to lookup an intermediate value $y=b^{a \cdot n}$ from a memory, with b being a base value;

c) set an error value $err=IN/b^n$ via a first shifter circuit; and d) initialize a counter value k, a second electronic logical calculation processing element that is configured to perform repeatedly each of the following e), f), g1), g2), g3), g4) until an exit criterion is fulfilled:

e) increment the counter value k by 1;

f) determine a power error value pen with pen=err$^b$ via a first multiplier circuit;

g1) adjust the intermediate value y by multiplying the intermediate value y with an adaptation value being dependent on the counter value k via a second multiplier circuit;

g2) divide the power error value pen by the base value b via a second shifter circuit;

g3) if the power error value pen is larger than or equal to an error threshold, select the output of the second multiplier circuit as a value y' with a first multiplexer and select the output of the second shifter circuit as a value err' with a second multiplexer;

g4) if the power error value pen is smaller than the error threshold, select the intermediate value y as a value y' with the first multiplexer and select the power error value per as the value err' with the second multiplexer; and a final electronic logical calculation processing element that is configured to set the output value to the value y'.

14. The processor according to claim 13, wherein the first shifter circuit comprises a barrel shifter for setting the error value err from the input value IN.

15. The processor according to claim 13, wherein the second shifter circuit comprises a 1-bit shifter for setting the error value err to the power error value perr divided by two.

16. The processor according to claim 13, wherein the first multiplier circuit comprises a square multiplier or a squaring device, for determining the power error value perr.

17. An image sensor arrangement, comprising an image sensor for providing sensor values from a plurality of image pixels, and a processor according to claim 13, for processing the sensor values as respective digital input values (IN) in a serial fashion.

18. An electronic device with a camera system comprising an image sensor arrangement according to claim 13.

\* \* \* \* \*

UNITED STATES PATENT AND TRADEMARK OFFICE
CERTIFICATE OF CORRECTION

| | |
|---|---|
| PATENT NO. | : 11,573,767 B2 |
| APPLICATION NO. | : 16/957979 |
| DATED | : February 7, 2023 |
| INVENTOR(S) | : Stefaan Margriet Albert Van Hoogenbemt |

Page 1 of 1

It is certified that error appears in the above-identified patent and that said Letters Patent is hereby corrected as shown below:

In the Claims

In Claim 12:

At Column 12, Line 45, "$b\dfrac{a}{b^{\wedge}k}$" should be --$b^{a/b^{\wedge}k}$--

Signed and Sealed this
Twenty-fifth Day of April, 2023

Katherine Kelly Vidal
*Director of the United States Patent and Trademark Office*